United States Patent [19]

Miyaji et al.

[11] Patent Number: 4,630,742
[45] Date of Patent: Dec. 23, 1986

[54] CONTAINER AND PLUG ASSEMBLY

[75] Inventors: Kenichi Miyaji; Shouji Toida; Seiichi Ito; Isao Watanabe; Masatoshi Kishida, all of Yoshidamachi, Japan

[73] Assignee: Nippon Sanso Kabushiki Kaisha, Japan

[21] Appl. No.: 738,652

[22] Filed: May 28, 1985

[30] Foreign Application Priority Data

May 31, 1984 [JP] Japan ................................. 59-80527

[51] Int. Cl.⁴ ............................................ B65D 25/18
[52] U.S. Cl. .................................... 215/13 R; 215/356
[58] Field of Search .................... 215/13 R, 13 A, 356, 215/357, 314; 220/420, 304

[56] References Cited

U.S. PATENT DOCUMENTS

3,017,047 1/1962 Payson et al. ......................... 215/356
4,351,451 9/1982 Chung ................................. 215/13 R Primary Examiner—Donald F. Norton
Attorney, Agent, or Firm—Hoffmann, Dilworth, Barrese & Baron

[57] ABSTRACT

Disclosed is an assembly of an elongated container and a plug therefor. The container has defined therein a receiving space for contents, an opening through which the contents are filled into the receiving space and discharged therefrom, and an annular ridge formed at a location spaced from the opening toward the receiving space a predetermined distance. The annular ridge defines a throat having a circumferentially continuous, planar sealing surface extending substantially longitudinally of the container a predetermined distance. The plug is threadedly engageable with the container so as to open and close the opening by axial one end of the plug. An annular resilient sealing member carried on the other axial end of the plug is in sealing contact with the planar sealing surface with the opening being closed by the axial one end of the plug threadedly engaged with the container.

18 Claims, 4 Drawing Figures

CONTAINER AND PLUG ASSEMBLY

BACKGROUND OF THE INVENTION

1. Field of the Invention

The present invention relates to an assembly of an elongated container and a plug therefor such as, for example, an assembly of a vacuum bottle and a plug therefor designed to maintain the desired temperature of contents.

2. Prior Art

A conventional container and plug assembly comprises an elongated container having a closed longitudinal one end and the other longitudinal end and a plug for the container. The container has a receiving space defined at the longitudinal one end for receiving contents such as, for example, hot or cold drinks, and an opening defined at the other longitudinal end. The contents are filled into the receiving space and are discharged therefrom through the opening. An annular ridge having a rounded annular top is formed between the opening and the receiving space and has a circumferential sealing surface defined at a flank of the annular ridge which faces to the opening.

The plug has one and the other axial ends and is threadedly engageable with the container so as to open and close the opening by the axial one end of the plug. An annular sealing member is carried on the other axial end of the plug.

The annular ridge having defined on the flank thereof the circumferential sealing surface is formed at a location spaced from the opening toward the receiving space a predetermined distance sufficient to provide a satisfactory heat insulation. With the opening being closed by the axial one end of the plug, the sealing member carried on the other axial end of the plug is in sealing contact with the circumferential sealing surface on the annular ridge, to thereby provide the heat insulation together with a fluid tightness.

However, in order to bring the sealing member carried on the other axial end of the plug into sealing contact with the circumferential sealing surface on the annular ridge simultaneously with the closure of the opening by the axial one end of the plug, it is required to manufacture the container and the plug so as to accurately position the annular ridge with respect to the opening and so as to accurately position the sealing member with respect to the axial one end of the plug. This inevitably necessitates severe manufacturing tolerances for the container and the plug, resulting in the increase in manufacturing cost of the container and plug assembly.

SUMMARY OF THE INVENTION

An object of the present invention is to provide a container and plug assembly which is easy in manufacturing and is capable of reducing the manufacturing cost.

Another object of the present invention is to provide a container and plug assembly which can provide reliable heat insulation and fluid tightness.

According to the present invention, there is provided a container and plug assembly comprising: an elongated container having a closed longitudinal one end and the other longitudinal end, the container having a receiving space defined at the longitudinal one end for receiving therein contents, an opening defined at the other longitudinal end, the contents being filled into the receiving space and discharged therefrom through the opening, and an annular ridge formed at a location spaced from the opening toward the receiving space a predetermined distance, the annular ridge defining a throat having a diameter less than that of the opening, the receiving space being in communication with the opening through the throat, the throat having a circumferentially continuous, planar sealing surface extending substantially longitudinally of the container a predetermined distance; a plug having one and the other axial ends and threadedly engageable with the container so as to open and close the opening by the axial one end of the plug, the plug having annular resilient sealing means carried on the other axial end of the plug; and the sealing means carried on the other axial end of the plug being in sealing contact with the planar sealing surface with the opening of the container being closed by the axial one end of the plug threadedly engaged with the container.

DESCRIPTION OF THE PREFERRED EMBODIMENTS OF THE INVENTION

Figure 1:
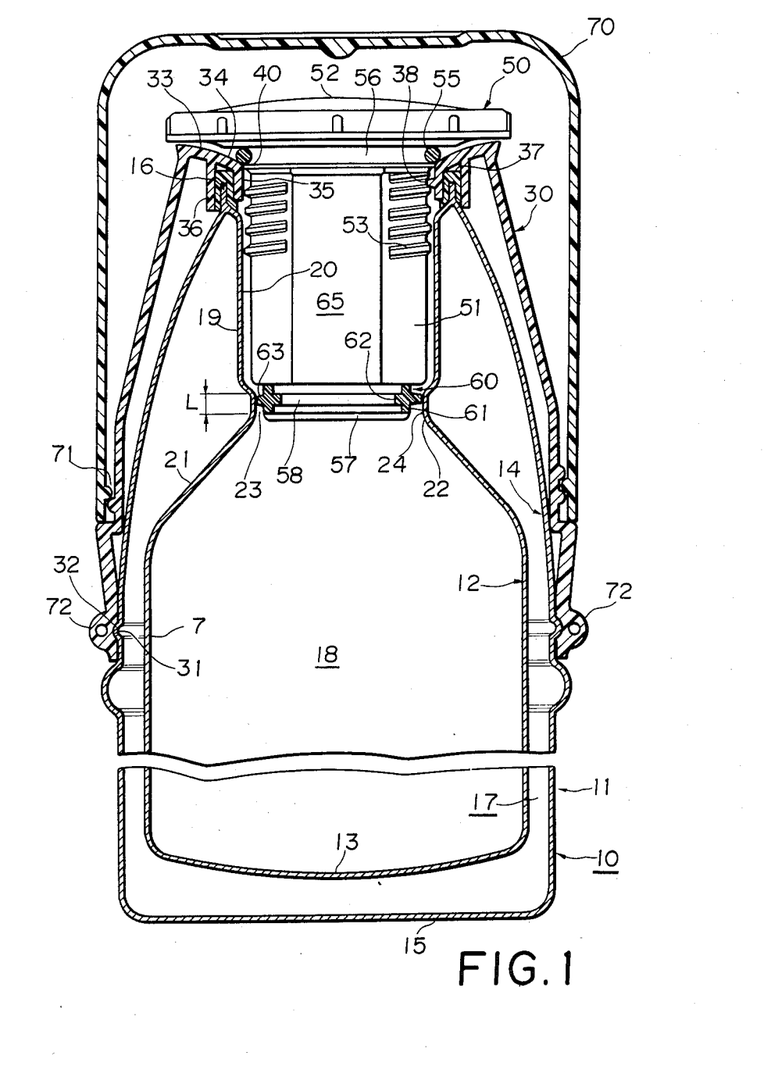
FIG. 1 is a partially broken-away, cross-sectional view showing a container and plug assembly in accordance with an embodiment of the present invention.
Figure 2:
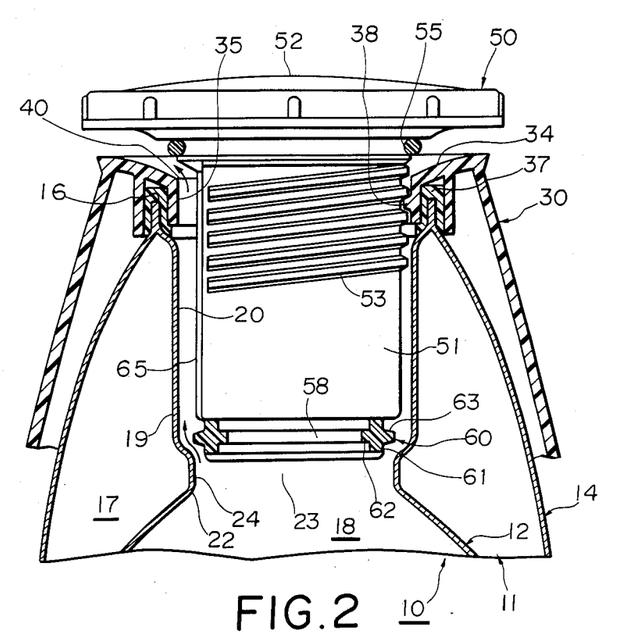
FIG. 2 is a fragmental cross-sectional view showing the container and plug assembly illustrated in FIG. 1 in which an opening in a container is opened by the loosening of a plug, with the cup-shaped closure being removed.

Referring to FIGS. 1 and 2, a container and plug assembly in accordance with an embodiment of the present invention comprises an elongated container, generally designated by the reference numeral 10, and a plug, generally designated by the reference numeral 50. The container and plug assembly is illustrated as being assembly of a portable vacuum bottle and a plug therefor.

The container 10 includes a container body, generally designated by the reference numeral 11, which comprises a metallic inner wall member 12 having a closed longitudinal one end 13 or bottom and a metallic outer wall member 14 having a closed longitudinal one end 15 or bottom. The inner and outer wall members 12 and 14 are made of stainless steel, for example, and are welded to each other at an annular projection 16 and cooperate with each other to define therebetween a vacuum heat-insulating space 17, a receiving space 18 for contents such as hot or cold drinks, and a cylindrical head portion 19 defining therein a portion of a mouth 20. A body portion 7 of the wall 12 is gradually reduced in diameter and is connected to the head portion 19 in an integral manner to form a tapered portion 21. An annular ridge 22 is formed at the connection between the head portion 19 and the body portion 17 and defines a throat 23 through which the mouth 20 is in communication with the receiving space 18. The throat 23 has a circumferentially continuous, planar sealing surface 24 extending substantially longitudinally of the container 10 a predetermined distance L. The planar sealing surface 24 may have a cylindrical shape or may be slightly tapered so as to converge toward the receiving space 18.

A generally frusto-conical shoulder member made of synthetic resin, generally designated by the reference numeral 30, has at axial one end thereof an annular groove 31 which is snap-fitted on an annular bead 32 on the outer wall member 14. The shoulder member 30 has at the other axial end thereof an end wall 33 having formed thereon a circumferentially continuous sealing surface 34 slightly tapered so as to converge toward the container body 11, and a pair of inner and outer cylindrical walls 35 and 36 extending from the end wall 33 toward the container body 11 in concentric relation to each other. The inner and outer walls 35 and 36 define therebetween an annular channel into which the annular projection 16 of the container body 11 is snugly fitted through an annular resilient sealing member 37 having a U-shaped cross-section. Thus, the shoulder member 30 is fluid-tightly mounted on the container body 11. The inner cylindrical wall 35 of the shoulder member 30 has an inner surface which defines the remaining portion of the mouth 20. A female thread 38 is formed on the inner surface of the inner cylindrical wall 35. An opening 40 is defined at the junction between the sealing surface 34 and the inner surface of the inner cylindrical wall 35. The opening 40 is in communication with the receiving space 18 through the mouth 20 and the throat 23 so that the contents are filled into the receiving space 18 and are discharged therefrom through the opening 40. The annular ridge 22 having formed thereon the annular sealing surface 24 is formed on the inner wall member 12 at a location spaced from the opening 40 toward the receiving space 18 a predetermined distance sufficient to provide a satisfactory heat insulation. The throat 23 defined by the annular ridge 22 is disposed in coaxial relation to the opening 40 and has a diameter less than that of the opening 40.

The plug 50 comprises a cylindrical body 51 and an enlarged disc-like head 52 integrally connected to axial one end thereof. The cylindrical body 51 has formed on a circumferential surface thereof a male thread 53 which is threadedly engageable with the female thread 38 on the shoulder member 30. The enlarged head 52 has a cylindrical gripping surface which is adapted to be gripped by a user's hand when it is desired to loosen or tighten the plug 50 threadedly engaged with the shoulder member 30, to open or close the opening 40, respectively. An O-ring seal 55 made of resilient material is snugly fitted in an annular groove 56 formed at the connection between the enlarged head 52 and the cylindrical body 51. The O-ring seal 55 is into sealing contact with the sealing surface 34 when the plug 50 threadedly engaged with the shoulder member 30 is tightened, to fluid-tightly close the opening 40. The cylindrical body 51 has the other axial free end which is reduced in diameter to form a cylindrical tip 57 having a diameter less than that of the throat 23. The cylindrical tip 57 has formed in a circumferential surface thereof an annular groove 58 which has rectangular cross-sectional shape. An integral annular sealing member, generally designated by the reference numeral 60, made of natural rubber or synthetic rubber such as, for example, silicone rubber, has a cylindrical body 61, an annular projection 62 extending radially inwardly from the body 61 in perpendicular relation thereto and an annular projection 63 extending radially outwardly from the body 61 in perpendicular relation thereto. The annular projection 63 has an annular free end which has a free diameter slightly greater than that of the throat 23 and which is in sealing contact with the planar sealing surface 24 on the throat 23 with the O-ring seal 55 being in sealing contact with the sealing surface 34 on the shoulder member 50 to close the opening 40. The annular projection 63 of the sealing member 60 has sufficient flexibility and resiliency and is configured and dimensioned such that the annular projection 63 is subjected only to a force directed substantially radially inwardly from the sealing surface 24 when the annular projection 63 is in sealing contact with the planar sealing surface 24 with the O-ring seal 55 being in sealing contact with the sealing surface 34 to close the opening 40.

The cylindrical body 51 of the plug 50 has formed in the circumferential surface of the cylindrical body 51 an axial recess which defines a passage 65 allowing the contents to be discharged from the receiving space 18 through the throat 23, the passage 65 and the opening 40 when the plug 50 threadedly engaged with the shoulder member 30 is slightly loosened to move the O-ring seal 55 and the sealing member 60 out of contact with the sealing surfaces 34 and 24, respectively, as shown in FIG. 2.

Referring again to FIG. 1, a cup-shaped closure 70 made of synthetic resin has an open end thereof which is threadedly engageable at 71 with the shoulder member 30. When the cup-shaped closure 70 is loosened and removed from the shoulder member 30, the closure 70 can serve as a cup. The shoulder member 30 has formed on the open end a pair of diametrically opposed lugs 72 for the attachment of a strap, not shown.

Figure 3:
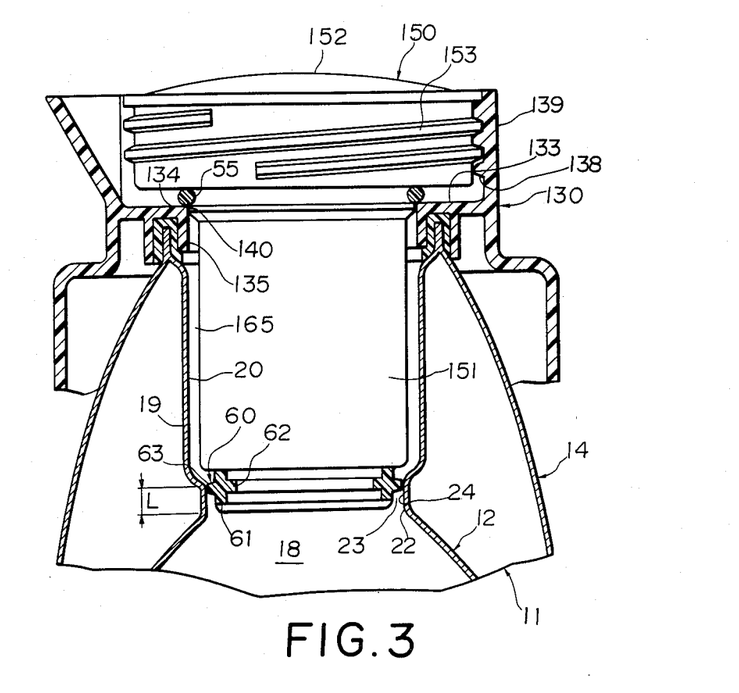
FIG. 3 is a fragmental cross-sectional view showing a container and plug assembly in accordance with another embodiment of the present invention, with a cup-shaped closure being removed.

FIG. 3 shows a container and plug assembly in accordance with another embodiment of the present invention. In FIG. 3, like reference numerals are used to designate components and parts like those of the embodiment shown in FIGS. 1 and 2, and the description of such like components and parts will be omitted for the purpose of simplification.

A plug 150 comprises a cylindrical body 151 and an enlarged disc-like head 152 integrally connected to axial one end of the body 151. The enlarged head 152 has formed on a cylindrical circumferential surface thereof a male thread 153. A shoulder member 130 includes a substantially cylindrical wall 139 projecting from an end wall 133 in the direction opposite to the container body 11. The cylindrical wall 139 has formed on an inner surface thereof a female thread 138 which is threadedly engageable with the male thread 153 on the plug 150. The cylindrical body 151 of the plug 150 has a diameter less than that of the mouth 20 defined by the head portion 19 of the inner wall member 12 of the container body 11 and an inner surface of a cylindrical wall 135 of the plug 130, to thereby define an annular passage 165 for allowing the contents to be discharged from the receiving space 18 through the throat 23, the passage 165 and an opening 140 defined at the junction between a sealing surface 134 and the inner surface of the cylindrical wall 135 of the shoulder member 130, when the plug 130 is slightly loosened to move the O-ring seal 55 and the sealing member 60 out of contact with the sealing surfaces 134 and 24, respectively.

Figure 4:
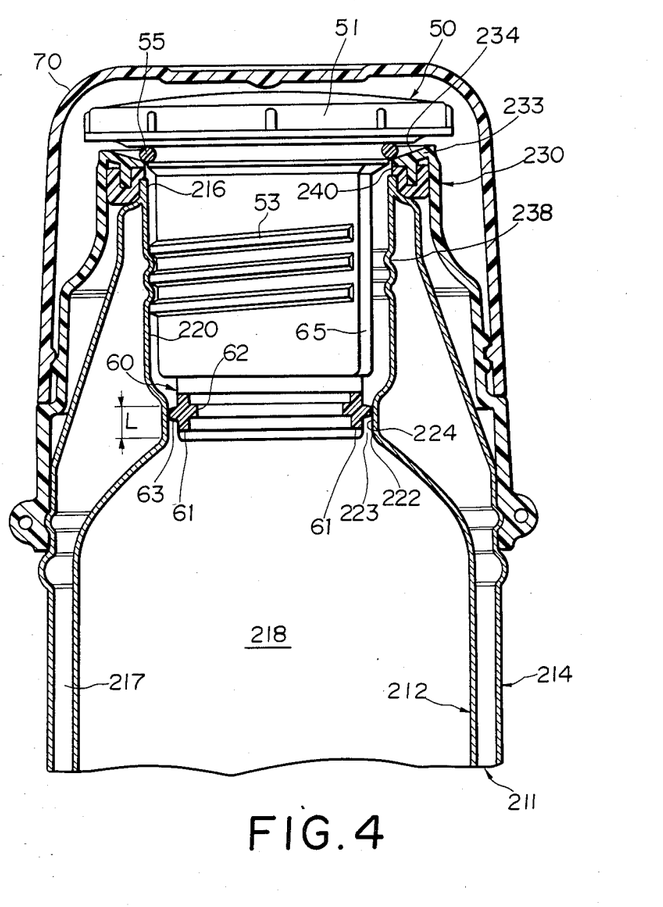
FIG. 4 is a fragmental cross-sectional view showing a container and plug assembly in accordance with a still further embodiment of the present invention.

FIG. 4 shows a still further embodiment of the present invention. In FIG. 4, like reference numerals are used to designate components and parts like those of the embodiment shown in FIGS. 1 and 2, and the description of such like components and parts will be omitted for the purpose of simplification.

A container body 211 comprises inner and outer stainless steel wall members 212 and 214 which are welded at 216 to each other and cooperate with each other to define therebetween a vacuum heat-insulating space 217. The inner wall member 212 defines therein a receiving space 218, a throat 233 and a mouth 220. A shoulder member 230 does not include a wall corresponding to the inner cylindrical wall of the shoulder member 30 shown in FIGS. 1 and 2, and the shoulder member 230 defines therein only an opening 240 which is closed by the O-ring seal 55 carried on the plug 50 when the O-ring seal 55 and the sealing member 60 are in sealing contact with a sealing surface 234 formed on an end wall 233 of the shoulder member 230 and a planar sealing surface 224 defined at the throat 223 by an annular ridge 222, respectively. The mouth 220 has formed thereon a female thread 238 with which the male thread 53 on the plug 50 is threadedly engageable.

Experimental Results

Experiments were conducted to ascertain heat insulation and liquid tightness of the container and plug assembly shown in FIG. 4 in which the receiving space 218 has a volume of 0.5 litter and the inner and outer wall members 212 and 214 are made of stainless steel.

(1) Heat Insulation

The container was filled with hot water of 95 degrees C. and was closed by the plug 50. The container and plug assembly was left under room temperature of 20±2 degrees C. for 24 hours. Thereafter, the temperature of the hot water was measured. The experiments were conducted on each of a case (A) where the container was maintained upstanding, i.e., at a normal attitude and a case (B) where the case was maintained laid down. The measured temperature of the hot water in the case (A) was 53 degrees C. and the measured temperature of the hot water in the case (B) was also 53 degrees C. From the experimental results, it was able to be ascertained that the container and plug assembly shown in FIG. 4 had a superior heat insulation even in the case where the container and plug assembly was maintained laid down and was particularly useful as a container and plug assembly of a portable type.

(2) Liquid Tightness

The container was filled with water, and the plug was tightened under a normal tightening force. The container and plug assembly was set on a vibratory testing machine with the assembly being maintained laid down thereon and, thereafter, vertical vibration was imparted to the assembly 10,000 times under the conditions of 1G and 8 to 50 Hz. After the experiments, it was inspected whether or not water leaked out of the container and plug assembly. The inspection did not indicate any water leakage, and it was able to be ascertained that the container and plug assembly had a superior liquid tightness.

As described above, the container and plug assembly in accordance with the present invention is constructed such that the throat 23, 223 has the planar sealing surface 24, 224 extending substantially longitudinally of the container 10 a predetermined distance L, and the sealing member 60 carried on axial one end of the plug 50, 150 is in sealing contact with the planar sealing surface 24, 224 with the opening 40, 140, 240 of the container being closed by the other axial end of the plug 50, 150. This construction of the present invention accommodates manufacturing dimensional errors in the position of the annular ridge 22, 122 from the opening 40, 140, 240 and the position of the sealing member 60 from the other axial end of the plug 50, 150, to the extent corresponding to the predetermined distance L of the planar sealing surface 24, 224. This enables the manufacture of the container and plug assembly to be rendered easy to reduce the manufacturing cost.

In addition, in the embodiments shown in FIGS. 1 through 4, the O-ring seal 55 is carried on the plug 50, 150 at a location adjacent to an axial end of the plug opposite to an axial end thereof on which the sealing member 60 is carried. The sealing member 60 is in sealing contact with the planar sealing surface 24, 224 with the O-ring seal 55 being in sealing contact with the sealing surface 34, 134, 234 defined adjacent to the opening 40, 140, 240, to thereby provide reliable heat insulation and fluid tightness.

Furthermore, in the embodiment illustrated in FIGS. 1 through 4, the sealing member 60 is constructed so as to comprise the cylindrical body 61 snugly fitted on the cylindrical tip 57 of the body 51, 151 of the plug 50, 150, and the annular projection 62 snugly fitted in the annular groove 58. This construction of the sealing member 60 enables the same to be reliably retained on the plug 50, 150 even if the annular projection 63 of the sealing member 60 is subjected to a force longitudinally of the container 10.

Moreover, in the embodiments shown in FIGS. 1 through 3 in which the plug 50, 150 is threadedly engageable with the female thread 38, 138 on the shoulder member 30, 130, a reaction force due to the resilient contact of the sealing member 60 with the planar sealing surface 24 is not substantially transmitted to the shoulder member 30, 130 through the plug 50, 150 when the sealing member 60 is in sealing contact with the planar sealing surface 24. This is because the annular projection 63 extending radially outwardly from the annular body 61 of the sealing member 60 has the annular free end in intimate contact with the planar sealing surface 24 such that the sealing member 60 is subjected only to a force directed substantially radially inwardly from the planar sealing surface 24 with the O-ring seal 55 being in sealing contact with the sealing surface 34, 134 to close the opening 40, 140. Thus, the shoulder member 30, 130 threadedly engaged with the plug 50, 150 can be prevented from being urged away from the container body 11 by the reaction force from the sealing surface 24 to damage the fluid tightness between the shoulder member 30, 130 and the container body 11 at the sealing member 16.

Additionally, in the embodiment shown in FIG. 4 in which the female thread 238 with which the male thread 53 on the plug 50 engages is formed on the inner wall member 214 of the container body 211, the plug 50 can be threadedly engaged with the inner wall member 214 such that the axis of the plug 50 is aligned with the longitudinal axis of the inner wall member 212, to thereby make reliable the sealing contact of the sealing member 60 with the planar sealing surface 224.

The preferred embodiments of the present invention have been described. However, the present invention should not be limited to the above embodiments. It should be appreciated that various changes and modifications can be made to the illustrated embodiments without departure from the scope of the appended claims. For example, the outer wall member 14, 214 may be made of synthetic resin.

What is claimed is:

1. A container and plug assembly comprising; an elongated container having a closed longitudinal one end and the other longitudinal end, said container having a receiving space defined at the longitudinal one end for receiving therein contents, an opening defined at the other longitudinal end, the contents being filled into said receiving space and discharged therefrom through said opening, and an annular ridge formed at a location spaced from said opening toward said receiving space a predetermined distance, said annular ridge defining a throat having a diameter less than that of said opening, said receiving space being in communication with said opening through said throat, said ridge having a circumferentially continuous sealing surface extending substantially longitudinally of said container a predetermined distance, a plug having one and the other axial ends and threadedly engageable with said container so as to open and close said opening by the axial one end of said plug, said plug having annular resilient sealing means carried on the other axial end of said plug, said sealing means carried on the other axial end of said plug being in sealing contact with said sealing surface with said opening of said container being closed by the axial one end of said plug threadedly engaged with said container, a circumferentially continuous second sealing surface formed on said container adjacent to said opening and said second sealing means carried on said plug adjacent to the one axial end thereof, the first-mentioned sealing means being in sealing contact with the first-mentioned sealing surface with said second sealing means being in sealing contact with said second sealing surface to close said opening, the first-mentioned sealing means comprises an annular body fitted in the other axial end of said plug and an annular projection extending radially outwardly from said annular body and having an annular free end in intimate contact with the first-mentioned sealing surface such that said first-mentioned sealing means is subjected only to a force directed substantially radially inwardly from the first-mentioned sealing surface with said second sealing means being in sealing contact with said second sealing surface to close said opening.

2. A container and plug assembly defined in claim 1, wherein said container has a substantially cylindrical mouth extending between said opening and said throat and female thread formed on said mouth, said plug being threadedly engageable with said thread on said mouth.

3. A container and plug assembly comprising; an elongated container having a closed longitudinal one end and the other longitudinal end, said container having a receiving space defined at the longitudinal one end for receiving therein contents, an opening defined at the other longitudinal end, the contents being filled into said receiving space and discharged therefrom through said opening, and an annular ridge formed at a location spaced from said opening toward said receiving space a predetermined distance, said annular ridge defining a throat having a diameter less than that of said opening, said receiving space being in communication with said opening through said throat, said ridge having a circumferentially sealing surface extending substantially longitudinally of said container a predetermined distance, a plug having one and the other axial ends and threadedly engageable with said container so as to open and close said opening by the axial one end of said plug, said plug having annular resistance sealing means carried on the other axial end of said plug, said sealing means carried on the other axial end of said plug being in sealing contact with said sealing surface with said opening of said container being closed by the axial one end of said plug threadedly engaged with said container, a circumferentially continuous second sealing surface formed on said container adjacent to said opening and second sealing means carried on said plug adjacent to the one axial end thereof, the first-mentioned sealing means being in sealing contact with the first-mentioned sealing surface with said second sealing means being in sealing contact with said second sealing surface to close said opening, the first-mentioned sealing means comprises an annular body fitted in the other axial end of said plug and an annular projection extending radially outwardly from said annular body and having an annular free end in intimate contact with the first-mentioned sealing surface such that said first-mentioned sealing means is subjected only to a force directed substantially radially inwardly from the first-mentioned sealing surface with said second sealing means being in sealing contact with said second sealing surface to close said opening, said container has a substantially cylindrical mouth extending between said opening and said throat and female thread formed on said mouth, said plug being threadedly engageable with said thread on said mouth, said container comprises a container body having defined therein said receiving space, said throat and a portion of said mouth, and a shoulder member fluid-tightly mounted on said container body so as to define said opening and the remaining portion of said mouth, said second sealing surface and said female thread being formed on said shoulder member.

4. A container and plug assembly defined in claim 3, wherein said plug comprises a cylindrical body and an enlarged head connected to an axial one end of said cylindrical body, the first-mentioned sealing means being carried on the other axial end of said cylindrical body, said second sealing means being carried at the connection between said cylindrical body and said enlarged head, said cylindrical body having formed on a circumferential surface thereof a male thread threadedly engageable with said female thread on said shoulder member.

5. A container and plug assembly defined in claim 4, wherein said cylindrical body of said plug has formed therein an axial recess defining a passage for allowing the contents to be discharged from said receiving space through said throat, said passage and said opening when said plug is loosened to move the first-mentioned sealing means and said second sealing means out of contact with the first-mentioned sealing surface and said second sealing surface, respectively.

6. A container and plug assembly defined in claim 5, wherein said container body comprises a metallic wall member and a metallic outer member connected to each other and cooperating with each other to define therebetween a vacuum heat-insulating space.

7. A container and plug assembly defined in claim 6, wherein said shoulder member is made of a synthetic resin.

8. A container and plug assembly defined in claim 7, wherein the first-mentioned sealing member is made of any one of natural rubber and silicone rubber.

9. A container and plug assembly defined in claim 8, wherein the first-mentioned sealing surface has a cylindrical shape.

10. A container and plug assembly defined in claim 8, wherein the first-mentioned sealing surface is slightly tapered so as to converge toward said receiving space.

11. A container and plug assembly comprising; an elongated container having a closed longitudinal one end and the other longitudinal end, said container having a receiving space defined at the longitudinal one end for receiving therein contents, an opening defined at the other longitudinal end, the contents being filled into said receiving space and discharged therefrom through said opening, and an annular ridge formed at a location spaced from said opening toward said receiving space a predetermined distance, said annular ridge defining a throat having a diameter less than that of said opening, said receiving space being in communication with said opening through said throat, said ridge having a circumferentially continuous sealing surface extending substantially longitudinally of said container a predetermined distance, a plug having one and the other axial ends and threadedly engageable with said container so as to open and close said opening by the axial one end of said plug, said plug having annular resilient sealing means carried on the other axial end of said plug, said sealing means carried on the other axial end of said plug being in sealing contact with said sealing surface with said opening of said container being closed by the axial one end of said plug threadedly engaged with said container, a circumferentially continuous, second sealing surface formed on said container adjacent to said opening and second sealing means carried on said plug adjacent to the one axial end thereof, the first-mentioned sealing means being in sealing contact with the first-mentioned sealing surface with said second sealing means being in sealing contact with said second sealing surface to close said opening, the first-mentioned sealing means comprises an annular body fitted in the other axial end of said plug and an annular projection extending radially outwardly from said annular body and having an annular free end in intimate contact with the first-mentioned sealing surface such that said first-mentioned sealing means is subjected only to a force directed substantially radially inwardly from the first-mentioned sealing surface said second sealing means being in sealing contact with said second surface to close said opening, said container has a substantially cylindrical mouth extending between said opening and said throat, said container comprising a container body having defined therein said receiving space, said throat and a portion of said mouth, and a shoulder member fluid-tightly mounted on said container body so as to define said opening and the remaining portion of said mouth, said shoulder member having formed thereon said second sealing surface and having a female thread formed on that portion of said shoulder member which is located opposite to said mouth with respect to said opening, said plug being threadedly engageable with said female thread on said shoulder member.

12. A container and plug assembly defined in claim 11, wherein said plug comprises a cylindrical body and an enlarged head connected to an axial one end of said cylindrical body, the first-mentioned sealing means being carried on the other axial end of said cylindrical body, said second sealing means being carried at the connection between said cylindrical body and said enlarged head, said enlarged head having formed on a cylindrical circumferential surface thereof a male thread threadedly engageable with said female thread on said shoulder member.

13. A container and plug assembly defined in claim 12, wherein said cylindrical body of said plug has a diameter less than that of said mouth to define therebetween an annular passage for allowing the contents to be discharged from said receiving space through said throat, said annular passage and said opening when said plug is loosened to move the first-mentioned sealing means and said second sealing means out of contact with the first-mentioned sealing surface and said second sealing surface, respectively.

14. A container and plug assembly defined in claim 13 wherein said container body comprises a metallic wall member and a metallic outer member connected to each other and cooperating with each other to define therebetween a vacuum heat-insulating space.

15. A container and plug assembly comprising; an elongated container having a closed longitudinal one end and the other longitudinal end, the container having a receiving space defined at the longitudinal one end for receiving therein contents, an opening defined at the other longitudinal end, the contents being filled into said receiving space discharged therefrom through said opening and an annular ridge formed at a location spaced from said opening toward said receiving space a predetermined distance, said annular ridge defining a throat having a diameter less than that of said opening, said receiving space being in communication with said opening through said throat, said ridge having a circumferentially continuous sealing surface extending substantially longitudinally of said container a predetermined distance, a plug having one and the other axial ends and threadably engageable with said container so as to open and close said opening by the axial one end of said plug, said plug having annular resilient sealing means carried on the other axial end of said plug, said sealing means carried on the other axial end of said plug being in sealing contact with said sealing surface with said opening of said container being closed by the axial one end of said plug threadedly engaged with said container, a circumferentially contianuous, second sealing surface formed on said container adjacent to said opening and said second sealing means carried on said plug adjacent to the one axial end thereof, the first-mentioned sealing means being in sealing contact with the first-mentioned sealing surface with said second sealing means being in sealing contact with said second sealing surface to close said opening, the first-mentioned sealing means and an annular projection extending radially outwardly from said annular body and having an annular free end in intimate contact with the first-mentioned sealing surface, such that said first-mentioned sealing means is subjected only to a force directed substantially radially inwardly from the first-mentioned sealing surface with said second sealing means being in sealing contact with said second sealing surface to close said opening, said container has a substantially cylindrical mouth extending between said opening and said throat and female thread formed on said mouth, said plug being threadedly engageable with said thread on said mouth, said container comprises a container body having defined therein said receiving space, said throat and said mouth, and a shoulder member fluid-tightly mounted on said container body so as to define said opening, said shoulder member having formed thereon said second sealing surface.

16. A container and plug assembly defined in claim 15, wherein said plug comprises a cylindrical body and an enlarged head connected to an axial one end of said cylindrical body, the first-mentioned sealing means being carried on the other axial end of said cylindrical body, said second sealing means being carried at the connection between said cylindrical body and said enlarged head, said cylindrical body having formed on a circumferential surface thereof a male thread threadedly engageable with said female thread on said mouth in said container body.

17. A container and plug assembly defined in claim 16, wherein said cylindrical body of said plug has formed therein an axial recess defining a passage for allowing the contents to be discharged from said receiving space through said throat, said passage and said opening when said plug is loosened to move the first-mentioned sealing means and said second sealing means out of contact with the first-mentioned sealing surface and said second sealing surface, respectively.

18. A container and plug assembly defined in claim 17 wherein said container body comprises a metallic wall member and a metallic outer member connected to each other and cooperating with each other to define therebetween a vacuum heat-insulating space.

* * * * *